United States Patent

[11] 3,617,085

| [72] | Inventor | Henry J. Modrey |
| | | 158 Eagle Drive, Stamford, Conn. 06903 |
| [21] | Appl. No. | 869,294 |
| [22] | Filed | Oct. 24, 1969 |
| [45] | Patented | Nov. 2, 1971 |

[54] QUICK-RELEASE LOAD COUPLER
5 Claims, 8 Drawing Figs.

[52] U.S. Cl. ................................................. 294/83, 294/93
[51] Int. Cl. .................................................. B66c 1/36
[50] Field of Search ..................................... 294/26, 67.4 A, 87.2, 89, 83, 93, 96, 102; 85/8.3; 242/130.2

[56] References Cited
UNITED STATES PATENTS
2,948,383 8/1960 Modrey ........................ 198/179
3,088,768 5/1963 Willison ....................... 294/93
3,405,965 10/1968 Haas............................. 294/83

*Primary Examiner*—Richard E. Aegerter
*Assistant Examiner*—Johnny D. Cherry
*Attorney*—Hane & Baxley ABSTRACT: A quick-release load coupler for releasably coupling a load to a load carrier has an engaging coupling member including a housing to which the load is coupled.

The engaging coupling member locks itself automatically to the receiving coupling member when applied thereto and can be released from said member by withdrawing a locking slide relative to a clamping rod which is axially stationary relative to the housing. Release of the coupler can be effected irrespective whether the coupler is under load or not. Both the locking and the releasing motions are in axial direction.

PATENTED NOV 2 1971 3,617,085
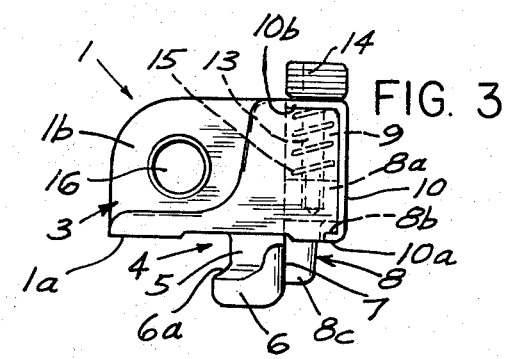
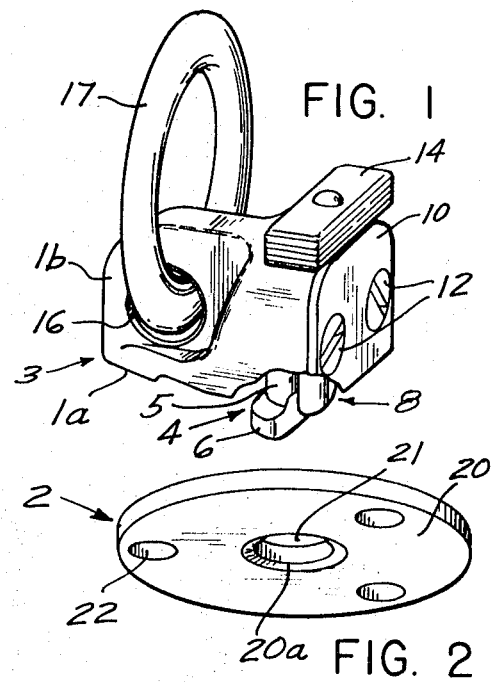
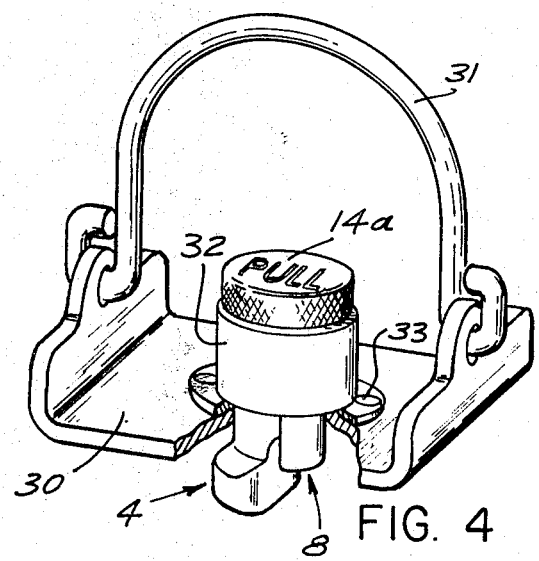
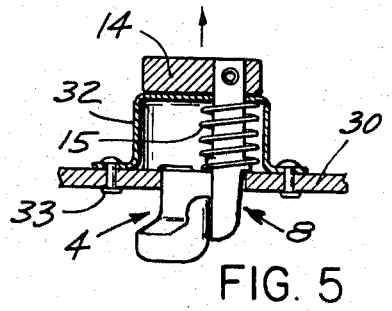
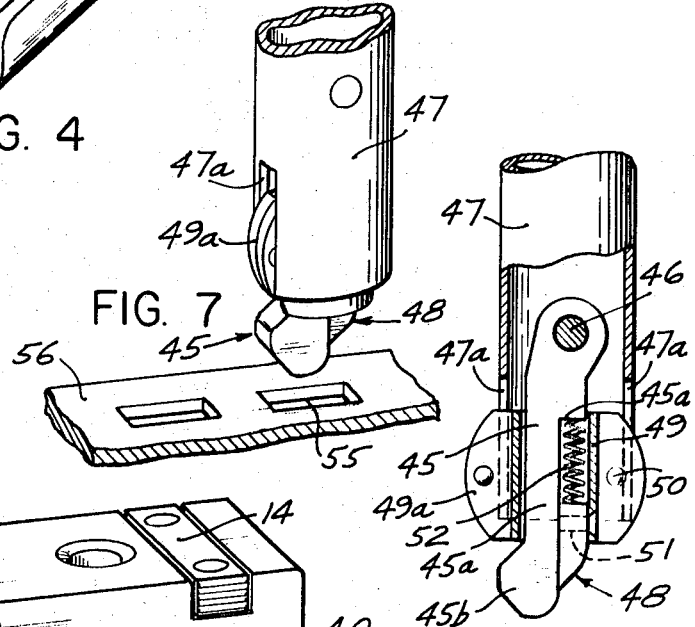
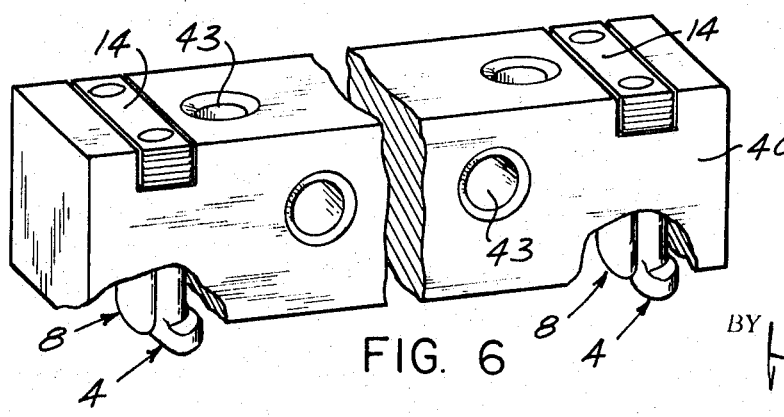
INVENTOR.
HENRY J. MODREY
BY Hane and Baxley
ATTORNEYS

QUICK-RELEASE LOAD COUPLER

The present invention relates to a coupler for releasably coupling a load to a load carrier such as a hoist and more particularly, to a quick-release self-locking load coupler which is releasable irrespective whether it is under load or not.

BACKGROUND

There are known quick-release load couplers of the general kind above referred to in which an engaging coupling member locks itself to a supporting receiving coupling member by means of a clamping rod axially displaceably mounted in the coupler housing protruding therefrom at both ends. One protruding end of the rod serves to attach the load thereto and the other terminates in a one-sidedly overhanging clamping head which in its locking position overhangs a receiving opening and is retained therein by a slide displaceable alongside the shank of the clamping rod. Withdrawal of the slide from the receiving opening against the action of a spring frees the clamping rod for withdrawal from the receiving coupling member thereby releasing the coupler.

When couplers of this kind as heretofore known, are used for supporting loads the pull of which is not at lease substantially axially aligned with the clamping rod but is at a more or less wide angle relative thereto, a correspondingly high bending moment acts upon the engaging coupling member and more specifically upon the clamping rod thereof as the load is attached to the same. As a result, the engaging coupling member is likely to be damaged. Moreover, due to the axially displaceable mounting of the rod, the rod and with it the entire engaging coupling member tend to wobble in the receiving coupling member. These inherent properties of the known couplers make the same not suitable for applications in which powerful bending moments are to be expected, or wobbling of the load to be supported or tied down cannot be tolerated. Moreover, couplers as heretofore known, usually do not permit free swiveling of the engaging coupling member and thus of the load through a full circle as is required for certain applications.

THE INVENTION

It is a broad object of the invention to provide a novel and improved coupler of the general kind above referred to in which the load is attached to the engaging coupling member in a manner such that bending forces as may occur are readily acceptable even if the pull direction of the load defines a wide angle such as a 90° angle with the axis of the clamping rod.

A more specific object of the invention is to provide a novel and improved coupler in which the load is attached directly to the housing of the engaging coupling member rather than to the clamping rod as is heretofore conventional. Such attachment of the load to the housing has the advantage that the load can be connected to the housing at a low point of attack by the bending force.

Another more specific object of the invention is to provide a novel and improved coupler which permits free swiveling of the engaging coupling member and thus of the load through a full circle.

Still another more specific object of the invention is to provide a novel and improved coupler in which the clamping rod is axially fixed in the engaging coupling member so that the same cannot wobble when applied to a matching receiving coupling member.

It is also an object of the invention to provide an assemblage of two or more novel and improved couplers of the general kind above referred to in which the engaging coupling members can be detached from their support only when all the engaging coupling members are simultaneously released. Such an arrangement constitutes a safeguard against premature or accidental release as is required in certain fields of application for example, aircraft construction.

A further object of the invention is to provide a novel and improved coupler the engaging coupling member of which can be applied only to a matching receiving coupling member thereby precluding the danger of locking an engaging coupling member to a receiving coupling member of a coupler which is not suitable for the load to be supported.

A still further object of the invention is to provide a novel and improved coupler which is specifically for releasably locking components such as tables or chairs, particularly airplane seats to the floor.

Other and further objects, features and advantages of the invention will be pointed out hereinafter and set forth in the appended claims constituting part of the application.

In the accompanying drawing several preferred embodiments of the invention are shown by way of illustration and not by way of limitation.

In the drawing:

FIG. 1 is a perspective view of the engaging coupling member of a quick-release load coupler according to the invention;

FIG. 2 is a perspective view of the receiving coupling member of the coupler according to FIG. 1;

FIG. 3 is a side view of the coupling member of FIG. 1;

FIG. 4 is a perspective view, partly in section, of a modification of a load coupler according to the invention;

FIG. 5 is a fragmentary sectional view of the load coupler according to claim 4;

FIG. 6 is a perspective view, partly in section, of a load coupler assemblage including two engaging coupling members;

FIG. 7 is a perspective view of a load coupler designed for releasably coupling a leg of a chair or table to a base plate; and FIG. 8 is a sectional view of the engaging coupling member of the coupler according to claim 7.

Referring now to the figures in greater detail and first to the load coupler exemplified in FIGS. 1, 2 and 3, the coupler according to these figures comprises an engaging coupling member 1 and a receiving coupling member 2.

The engaging coupling member comprises a housing 3 from which extends integral therewith a clamping rod 4. The rod comprises a shank 5 terminating in a clamping head 6 which overhangs one-sidedly the shank. The shank and the clamping head are flattened on the side 7 opposite the overhang of the clamping head and a locking slide 8 is slidably disposed along the flattened side of the clamping rod. The slide has an enlarged portion 8a protruding into a recess 9 within the housing and is held therein by a cover plate 10 having a flange 10a engageable with a shoulder 8b formed on slide portion 8a. The cover plate is releasably secured to housing 3 for instance, by screws 12. A portion 8c of reduced peripheral outline protrudes from the housing and alongside the flattened side 7 of the head 6 of the clamping rod.

The slide can be withdrawn from the position shown in FIG. 3 by means of an actuating member 13 secured to slide part 8 and protruding through and from an upper flange 10b of cover plate 10. More specifically, the actuating member is shown as a bolt screwed into slide portion 8a and mounting a grip 14. The grip is shown in the form of a crossbar resting upon flange 10b of the cover plate. A loaded spring 15 disposed within recess 9 between the top of the slide portion 8a and flange 10b biases the slide into the position shown in FIGS. 1 and 3.

Housing 1 has a substantially plane surface 1a on its side from which the clamping rod and the locking slide protrude for a purpose which will be more fully explained hereinafter. The housing is provided with a suitable support member for fastening a load to be supported to the housing. This support member is shown as a heavy flange 1b with a hole 16 therethrough. The flange with the hole therethrough constitutes a mounting eye mounting a ring 17 to which a load can be conveniently secured. As may be observed, the mounting hole is closely adjacent to the base 1a and also to the slide and the rod so that the lever arm with which the load acts upon the clamping rod and the slide, is short in virtually any angular direction in which the load may pull with reference to the clamping rod and the slide. In other words, the load acts upon the coupler at a low point of attack so that the occurring bending forces are correspondingly low.

The receiving coupling member is basically a plate-shaped member 20 having a circular receiving hole 21 therethrough. By way of illustration, the receiving member is shown as a circular plate which can be suitably secured to a support for instance, by means of screws or rivets as is indicated by three holes 22. For a reason which will be explained more fully hereinafter, space must be provided in the support below hole 21. The receiving hole can also be provided directly in the ultimate support for the engaging coupling member.

The peripheral outline of clamping head 6 is such that it fits the peripheral outline of mounting hole 21 and the combined peripheral outline of shank 5 and slide portion 8c is also such that it fits the peripheral outline of the mounting hole. However, the combined peripheral outline of clamping head 6 and slide portion 8c is such that it is in excess of the peripheral outline of the mounting hole. Finally, the combined peripheral outline of shank 5 and slide portion 8c has a substantially circular cross-sectional configuration which fits the circular configuration of mounting hole 21 for a purpose which will become more fully apparent from the subsequent description. The rim of the mounting hole is preferably countersunk on its bottom side as is shown at 20a and the thickness of plate 20 is preferably equal to the length of shank 5.

The load coupler as hereinbefore described, functions as follows:

Let it be assumed that a load is attached to ring 17 and that it is desired to lock coupling member 1 to coupling member 2. To effect such locking housing 3 is pressed with its flat side 1a against the upper side of plate 20 which constitutes the receiving side of the plate. As is best shown in FIG. 3, the clamping head tip protrudes from the tip of the slide in the forward position thereof so that the tip of the clamping head can be conveniently guided into the receiving hole. As the clamping head penetrates deeper into the receiving hole the tip of the slide engages the rim of the plate so that the slide is pushed back against the action of spring 15. When the clamping head has fully penetrated the thickness of plate 20 the continuing downward pressure causes a lateral movement of the clamping head and thus of the entire engaging coupling member thereby making space available for the locking slide which is now snapped by the action of spring 15 into the receiving hole and alongside the clamping head. The clamping head and thus the engaging coupling member are now locked to the receiving coupling member.

Due to the aforedescribed substantially circular combined outline of shank 5 and slide portion 8c the engaging coupling member is fully free to swivel in plate 20. Smooth swiveling of the engaging coupling member is assisted by engagement of a slanted surface 6a on the clamping head with the countersunk rim 20a on plate 20. As the housing rests with its flat surface 1a on plate 20 and the length of shank 5, that is, the length of rod 4 protruding from surface 1a matches the thickness of the plate, wobbling of the engaging coupling member in the receiving coupling member is effectively prevented.

As is now evident, the attack point of the load is very low and the leverage is very short so that there is virtually no danger of bending or otherwise damaging the mechanism of the engaging coupling member. As is also evident from the previous description, the engaging coupling member will fit only the receiving coupling member for which it is specifically designed thereby virtually eliminating the danger that a load is coupled to an engaging coupling member which is not capable of supporting the load, or which is otherwise not designed for receiving the load.

Release of the coupler is effected by withdrawing slide 8 from receiving hole 21 thereby freeing the clamping head for withdrawal from the hole. As is apparent, withdrawal of the slide is effected by means of grip 14 merely against the action of spring 15 and is hence entirely independent of the pull of the load. In other words, the coupler can be released with equal facility whether it is under load or not.

The engaging coupling member according to FIGS. 4 and 5 is similar to the one hereinbefore described except that the housing 3 is functionally replaced in part by a plate 30 to which the load is suitably secured for instance, by means of a bail 31. The clamping rod 4 is fixedly secured to plate 30 or integral therewith. Slide 8 as previously described is slidably accommodated in a casing 32 suitably secured to plate 30 for instance, by rivets 33. The end of the slide protruding from casing 32 has secured thereto grip 14 in the form of a knob so that the slide can be withdrawn by means of a knob 14a from the position shown in FIGS. 4 and 5 against the action of spring 15.

The relation of the peripheral outlines of the clamping head, the shank, the clamping rod and the slide with reference to the mounting hole in a support plate (not shown but similar to the mounting plate of FIG. 2) are the same as described in connection with FIGS. 1, 2 and 3.

It is believed that the function of the engaging coupling member according to FIGS. 4 and 5 is fully apparent from the previous description.

FIG. 6 shows an assemblage in which two or more engaging coupling members are combined in a common carrier shown as an at least partly hollow bar 40. The mechanisms for each of the coupling members should be visualized to be constructed and to function as described in detail in connection with FIGS. 1 and 3.

The receiving coupling member should be visualized as being similar to the receiving coupling member of FIG. 2 except that a suitably dimensioned and located mounting hole must be provided for each clamping rod-slide mechanism.

To apply the engaging coupling members of FIG. 6 to the receiving coupling member (or members each with one receiving hole) the bar is simply pressed against the receiving plate. As all the engaging coupling members face in the same direction they will lock themselves simultaneously to the receiving member in the manner previously described.

The assemblage of FIG. 6 does not only increase the locking strength of the coupler and thus the load-carrying capability thereof but also constitutes a safeguard. As is evident, bar 40 can be released only by operating both release grips 14 thereby reducing the danger of an accidental or unintentional release of a load. A safeguard of this kind is frequently used and required for aviation equipment.

The two grips can be arranged for independent operation, or they can be ganged by suitable means so that they are simultaneously lifted.

One or several loads can be secured to bar 40 as is indicated by several mounting holes 43.

While in all previous figures a grip 14 is shown for manual withdrawal of the slide for purposes of release, other means for withdrawing the slide can, of course, also be provided. There may be used pull rings or a wire pull; a solenoid or a hydraulic device may also be provided and all such devices may be operated by direct control or remote control.

While the hereinbefore-described couplers are essentially designed for tying down heavy components such as cargo or aircraft components, for instance, batteries, generators, water containers, turbines, etc., FIGS. 7 and 8 show a coupler for securing a table, a chair or seat for instance, an airplane seat, to the floor.

According to FIGS. 7 and 8, a clamping rod 45 is pivotally mounted by a pin 46 in a chair leg 47. Such mounting prevents axial displacement of the clamping rod relative to the leg but permits swinging movement therein for a purpose which will become more fully apparent from the subsequent description. The rod has a shank portion 45a and a one-sidedly overhanging head 45b. The clamping rod coacts with a slide 48 slidable alongside the clamping rod on the side thereof opposite to the overhang. The slide is secured to and within a tubular member such as for instance, a boxlike structure 49 composed of two complementary parts secured to each other by rivets 50 through laterally extending wings 49a and to the slide by a rivet 51. The wings protrude through slots 47a in chair leg 47 as is clearly shown in the figures. A loaded coil spring 52 abutting against the slide and a shoulder 45a of the rod biases the slide toward its forward position alongside clamping head 45b. Member 49 retains the slide and the spring in position relative to the rod which also extends through the member. The member can pivot about pin 46, slots 47a permitting such pivotal movement, and it can also be displaced jointly with the slide lengthwise of the rod. The protruding wings serve as actuating means for withdrawing member 49 and thus the slide relative to the clamping head to release the engaging coupling member constituted by the rod-slide mechanism.

The engaging coupling member coacts with a receiving opening 55 in the form of a slot in a floor plate 56 which may be visualized as the floor of an airplane.

The peripheral outline of clamping head 45b is again such that it fits slot 55. Similarly, the combined peripheral outline of shank 45a and slide 48 is such that it fits the slot while the combined outline of the clamping head and the slide is such that it is in excess of the peripheral outline of the slot. To lock a chair leg to the floor the leg is simply pressed down against the floor plate. Due to such downward pressure the clamping head 45 will first pass through the slot to be followed by the slide as has been described in connection with FIGS. 1, 2 and 3.

As is apparent from the previous description, the locking movement requires that the engaging coupling member or more specifically, the clamping head after having penetrated the mounting hole, performs a lateral motion to make place available for the slide. Such lateral movement of the engaging coupling member with reference to the receiving coupling member is readily possible with couplers according to FIGS. 1 to 6 but it is difficult if not impossible when the engaging coupling member is incorporated in a leg of a heavy airplane seat. The pivotal mounting of the clamping rod as is shown in FIGS. 7 and 8 eliminates the need for moving the entire chair relative to the floor. The clamping rod together with structure 49 will automatically swing sufficiently to permit entry of the slide.

Release of the chair from the floor is effected by withdrawing the slide from mounting hole 55 by means of wings 49a.

What is claimed is:

1. A quick-release load coupler comprising in combination:
an engaging coupling member and a receiving coupling member;
said engaging coupling member including a support member, a clamping rod mounted at one end on said support member secured against axial displacement relative thereto, the other end of the rod protruding from a base wall of the support member terminating in a one-sidedly overhanging clamping head, a locking slide supported by the support member axially slidable along the clamping rod on the side thereof opposite to the overhang of said head, spring means biasing said slide toward the position juxtaposed to the clamping head, actuating means coupled to the slide for retracting the same relative to the clamping head, said support member comprising a housing including on one side a recess accommodating the slide and the spring means therein, a base wall of the housing being substantially flat for placement upon the plate member of the receiving coupling member, and a load-mounting means for attaching a load thereto at any angle between the direction parallel to the axis of the rod and the direction normal thereto, said load-mounting means comprising a flange laterally extending from the opposite side of the housing substantially coplanar with said base wall and a load attachment means disposed closely adjacent to said flange; and
said receiving coupling member including a plate member having a receiving opening, the peripheral outline of the clamping head and also the combined peripheral outline of the rod between the head and the base plate and of the slide fitting the peripheral outline of the receiving opening, the combined peripheral outline of the clamping head and the slide being in excess of the peripheral outline of the receiving opening,
whereby pressing the base plate of the housing against the receiving coupling member in registry with the opening therein causes first penetration of the clamping head into the opening and then retraction of the slide against the action of said spring means to make space available for passage of the head through the opening, said passage, in turn, making space available for entry of the slide into the receiving opening by action of said spring means thus locking the clamping head within the opening, release of the clamping rod being effected by withdrawing the slide by operating said actuating means.

2. The load coupler according to claim 1 wherein said clamping rod is integral with said support member.

3. The load coupler according to claim 1 wherein said actuating means comprises a grip protruding from the top wall of said housing.

4. The load coupler according to claim 1 whereby the combined peripheral outline of the rod between the clamping head and the base wall and of the slide is substantially circular whereby the support member with the load attached to the load-mounting means is free to swivel through an angle of 360° within the receiving opening.

5. The load coupler according to claim 1 wherein the distance between the rod end protruding from the base wall of the housing and the base of the clamping head is substantially equal to the thickness of the plate member of the receiving coupling member.

* * * * *